United States Patent
Carpenter et al.

(10) Patent No.: US 12,214,732 B2
(45) Date of Patent: Feb. 4, 2025

(54) REAR CAMERA TRIANGULATION MIRROR

(71) Applicant: Continental Automotive Systems, Inc., Auburn Hills, MI (US)

(72) Inventors: Kyle P Carpenter, Clarkston, MI (US); Danny Bynum, Lake Orion, MI (US); Matthew Donald Berkemeier, Beverly Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 409 days.

(21) Appl. No.: 17/449,954

(22) Filed: Oct. 5, 2021

(65) Prior Publication Data
US 2023/0109443 A1    Apr. 6, 2023

(51) Int. Cl.
*B60R 11/04*    (2006.01)
*B60R 1/06*    (2006.01)

(52) U.S. Cl.
CPC ............... *B60R 11/04* (2013.01); *B60R 1/06* (2013.01); *B60R 2300/8066* (2013.01)

(58) Field of Classification Search
CPC ... B60R 11/04; B60R 1/06; B60R 2300/8066; B60R 1/003; B60R 2300/00; B60R 2300/808
See application file for complete search history.

(56) References Cited

U.S. PATENT DOCUMENTS

| | | |
|---|---|---|
| 4,905,376 A | 3/1990 | Neeley |
| 6,923,463 B1 | 8/2005 | Ford |
| 6,932,374 B1 | 8/2005 | Timms |
| 2005/0111120 A1* | 5/2005 | Plaster ............... B60R 1/28 359/850 |
| 2007/0216136 A1* | 9/2007 | Dietz ............... B60D 1/62 280/477 |
| 2010/0039515 A1 | 2/2010 | Dietz |
| 2021/0170820 A1* | 6/2021 | Zhang ............... B60D 1/36 |

FOREIGN PATENT DOCUMENTS

WO    2007106777 A2    9/2007

OTHER PUBLICATIONS

The International Search Report and the Written Opinion of the International Searching Authority mailed on Feb. 6, 2023 for the counterpart PCT Application No. PCT/US2022/077599.

\* cited by examiner

*Primary Examiner* — Jeffery A Williams
*Assistant Examiner* — Tyler B Edwards

(57) ABSTRACT

A camera system for a vehicle provides for the generation of different perspectives with a single camera to improve location accuracy. The camera system includes a camera configured for generating an image of an area proximate the vehicle and a mirror mounted proximate the camera and within a field of view of the camera. The mirror provides a secondary view of the area proximate the vehicle to the camera that is included as part of a single image.

10 Claims, 5 Drawing Sheets

REAR CAMERA TRIANGULATION MIRROR

TECHNICAL FIELD

The present disclosure relates to a camera system and method for locating an object proximate a vehicle.

BACKGROUND

Vehicles include rear facing cameras for providing a driver a clear view of objects behind the vehicle that are not otherwise visible. Additionally, the rear facing camera may be utilized to assist or automate backing up and trailer hitching operations. Accurate information of surrounding objects such as a trailer and hitch position is needed for trailer hitch assist systems to operate as desired.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A camera system for a vehicle according to an example disclosed embodiment includes, among other possible things, a camera configured for generating an image of an area proximate the vehicle, and a mirror mounted proximate the camera and within a field of view of the camera, the mirror mounted to provide a secondary view of the area proximate the vehicle to the camera.

In another disclosed embodiment of the foregoing camera system, the image generated by the camera includes a primary view of the area proximate the vehicle that is viewed directly by the camera and the secondary view of the area proximate the vehicle viewed in the mirror by the camera.

In another disclosed embodiment of any of the foregoing camera systems, the camera comprises a single view camera and the image includes the primary view and the secondary view.

In another disclosed embodiment of any of the foregoing camera systems, the primary view provides a first perspective of the area proximate the vehicle and the secondary view provides a second perspective of the area proximate the vehicle.

Another disclosed embodiment of any of the foregoing camera systems including a controller programmed to determine a distance from the camera to an object proximate the vehicle based on the first perspective provided by the primary view and the second perspective provided by the secondary view.

In another disclosed embodiment of any of the foregoing camera systems, the controller is programmed to determine a distance from the mirror to the object based on a fixed orientation between the mirror and the camera.

In another disclosed embodiment of any of the foregoing camera systems, both the camera and the mirror are fixed.

In another disclosed embodiment of any of the foregoing camera systems, an orientation of the camera relative to the mirror is fixed.

In another disclosed embodiment of any of the foregoing camera systems, the camera comprises a single view camera.

A rearview camera system for a motor vehicle according to another disclosed embodiment includes, among other possible things, a camera configured for generating an image of an area proximate the vehicle, the camera mounted in a fixed orientation on the vehicle such that a portion of a field of view of the camera is obstructed by portion of the vehicle and a mirror mounted proximate the camera and within a field of view of the camera, the mirror mounted to provide a secondary view of the area proximate the vehicle to the camera, wherein the image generated by the camera includes a reflected image that replaces the portion of the field of view obstructed by the vehicle.

In another disclosed embodiment of the foregoing rearview camera system, the mirror is mounted in a fixed orientation below the camera.

In another disclosed embodiment of any of the foregoing rearview camera systems, the mirror is mounted at a fixed angle relative to the camera.

Another disclosed embodiment of any of the foregoing rearview camera systems includes a controller programmed to identify an object in the image and a reflected image of the object in the mirror and determine the position of the object relative to the vehicle based on the image and reflected image.

In another disclosed embodiment of any of the foregoing rearview camera systems, the obstructed portion of the image comprises a portion of a bumper of the vehicle.

A method of locating an object proximate a vehicle according to another disclosed embodiment includes, among other possible things, capturing an image of an environment surrounding a vehicle and a reflection within a mirror with a single camera, identifying an object within the environment, identifying a reflection of the object within the mirror and determining a position of the object relative to the vehicle using both the identified object and the reflection of the object.

Another embodiment of the foregoing method includes determining an angle between the camera and a point on the mirror corresponding with reflection of the object and using the determined angle to determine the position of the object relative to the vehicle.

In another embodiment of any of the foregoing methods, the mirror is mounted at a fixed angle and position relative to the camera.

In another embodiment of any of the foregoing methods, the camera includes a first field of view and the mirror is set to provide a second field and the second field of view overlaps a portion of the first field of view to define an overlapped field of view.

In another embodiment of any of the foregoing methods, the camera includes a 180 degree field of view and a portion of the 180 degree field of view is replaced in the captured image by the second field of view provided by the mirror.

Another embodiment of any of the foregoing methods further includes generating a first perspective of the object with the camera and second perspective of the object in the mirror and utilizing the first perspective and the second perspective to determine the position of the object relative to the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
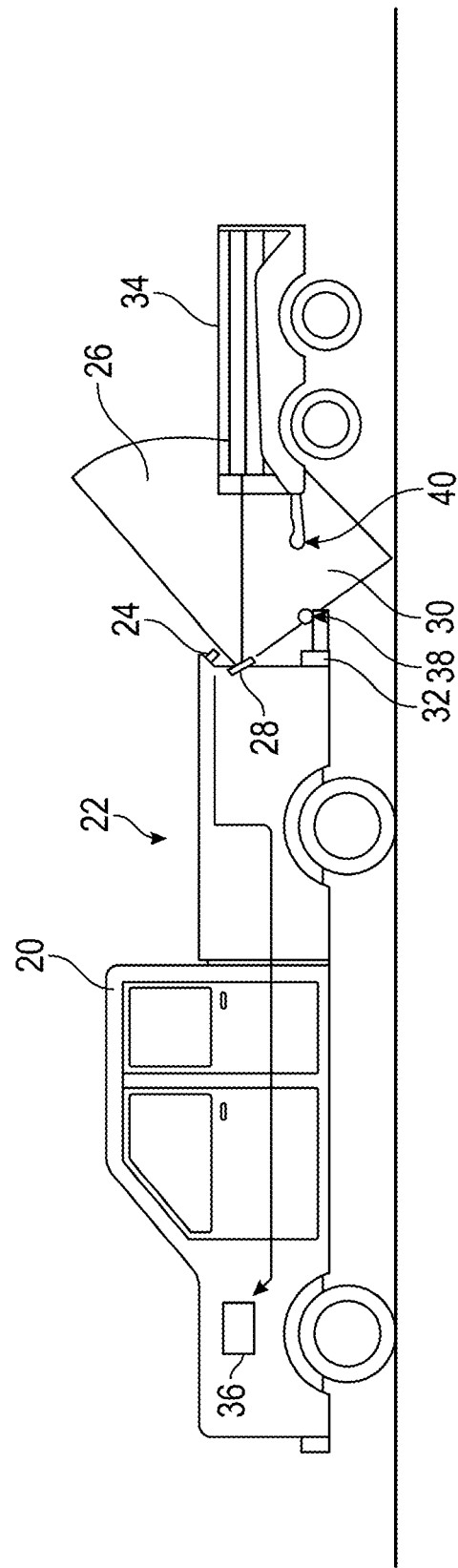
FIG. 1 is a schematic view of a vehicle including an example rear view camera system embodiment.

Referring to FIG. 1, a vehicle 20 and trailer 34 are schematically shown proximate each other. The vehicle 20 includes a camera system 22 for identifying and locating objects, such as a trailer 34 proximate the vehicle 20. The example system 22 includes a rear facing camera 24 mounted to an aft portion of the vehicle 20. The example camera 24 generates images of an environment to the rear of the vehicle 20 and provides those images to a controller 36. The controller 36 utilizes the supplied images for various systems of the vehicle 20, such as for example a trailer hitch assist system.

The example camera 24 generates an image with a field of view that expands to approximately 180 degrees. A mirror 28 is mounted to the vehicle proximate the camera 24 to provide an additional perspective of objects near the vehicle. The additional perspective includes images reflected in the mirror 28. The reflection in the mirror of the objects are viewable by the camera 24. Accordingly, the images captured by the camera 24 include both the surrounding area and reflected images of the surrounding area within the mirror 28. The different perspectives captured within the same image provides for improved location of objects around the vehicle 20.

Figure 2:
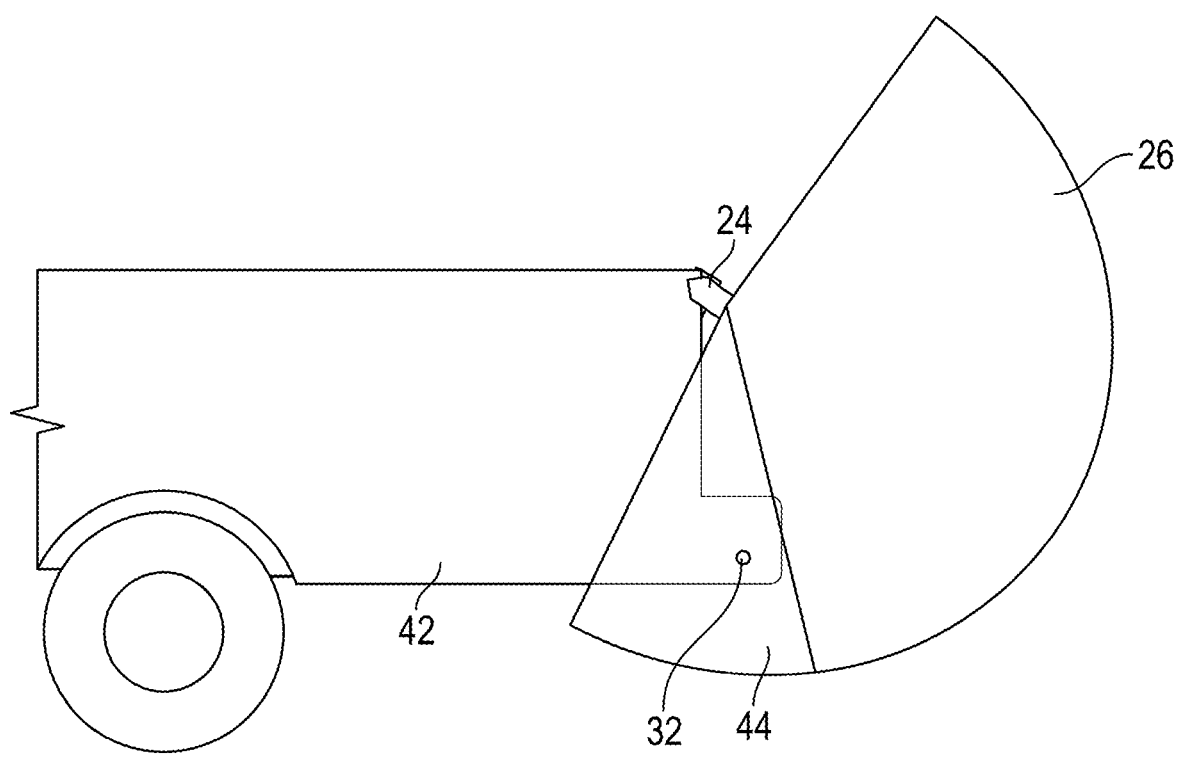
FIG. 2 is a schematic view of a field of view of single rear view camera.

Referring to FIG. 2 with continued reference to FIG. 1, the field of view 26 of the camera 24 is approximately 180 degrees relative to the camera face. A portion of this field of view 44 provides only a view of a bumper 32 and other surfaces of an aft portion 42 of the vehicle 20. Accordingly, the portion 44 of the field of view 26 is not useful to obtaining information about objects proximate the vehicle 20.

Figure 3:
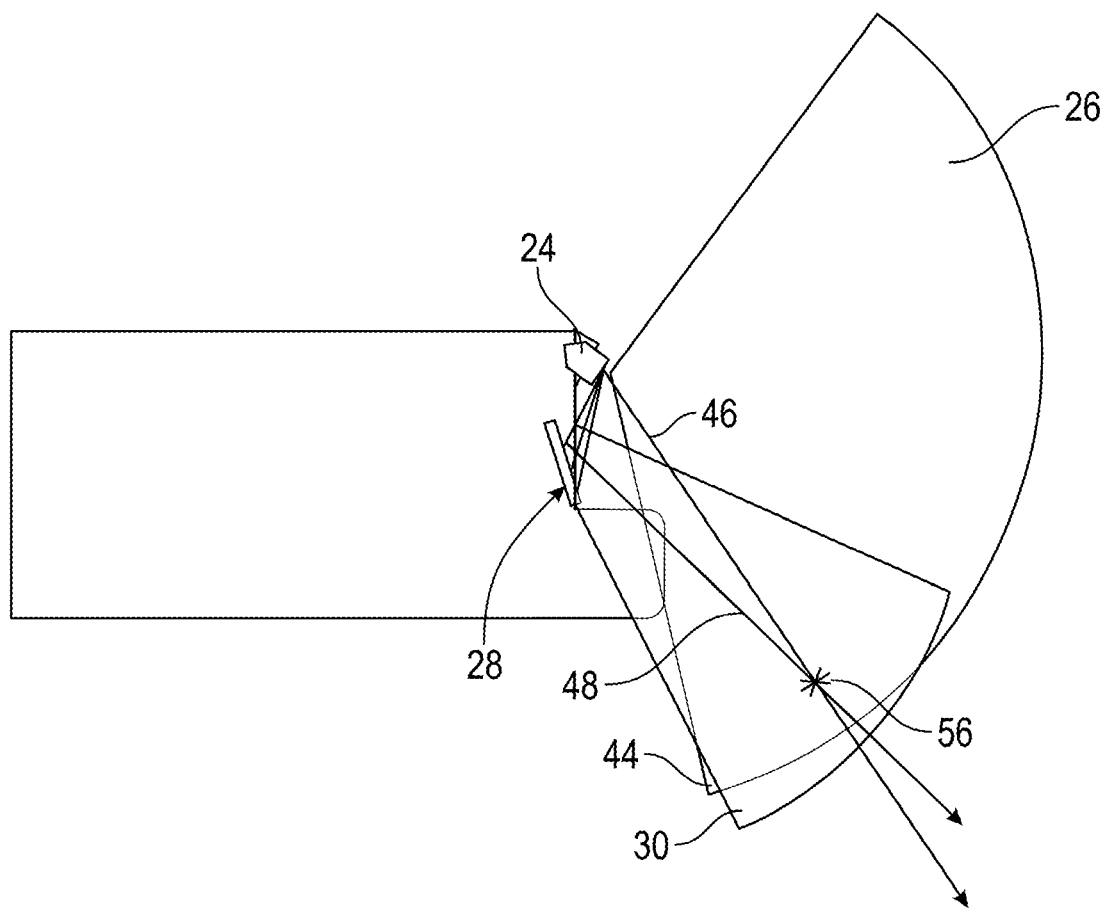
FIG. 3 is a schematic view of an example rear view camera system embodiment.

Referring to FIG. 3, with continued reference to FIG. 1, the mirror 28 is mounted proximate the camera 24 in a location that replaces the portion 44 of the field of view 26 with a secondary field of view 30. The secondary field of view 30 is present in the mirror and viewable by the camera 24. The secondary field of view 30 overlaps a portion of the primary field of view 26. In the overlapping portion of the field of view, the camera 24 captures two perspectives on any object detected. The two perspectives are utilized to triangulate a position of an object. Triangulating a position of a detected object improves accuracy and confidence that can improve the overall function of any system utilizing the images.

In this example, the camera 24 and mirror 28 are mounted relative to each other in a known fixed orientation. When an object proximate the vehicle is detected, the camera 24 provides a first perspective 46 by a direct line of sight to the object. The mirror 28 includes a reflection of the object and provides a second perspective 48 due to the reflection being offset from the camera 24. The first perspective 46 and the second perspective 48 are viewable in a common image and provide for the determination of a position 56 of an object.

Figure 4:
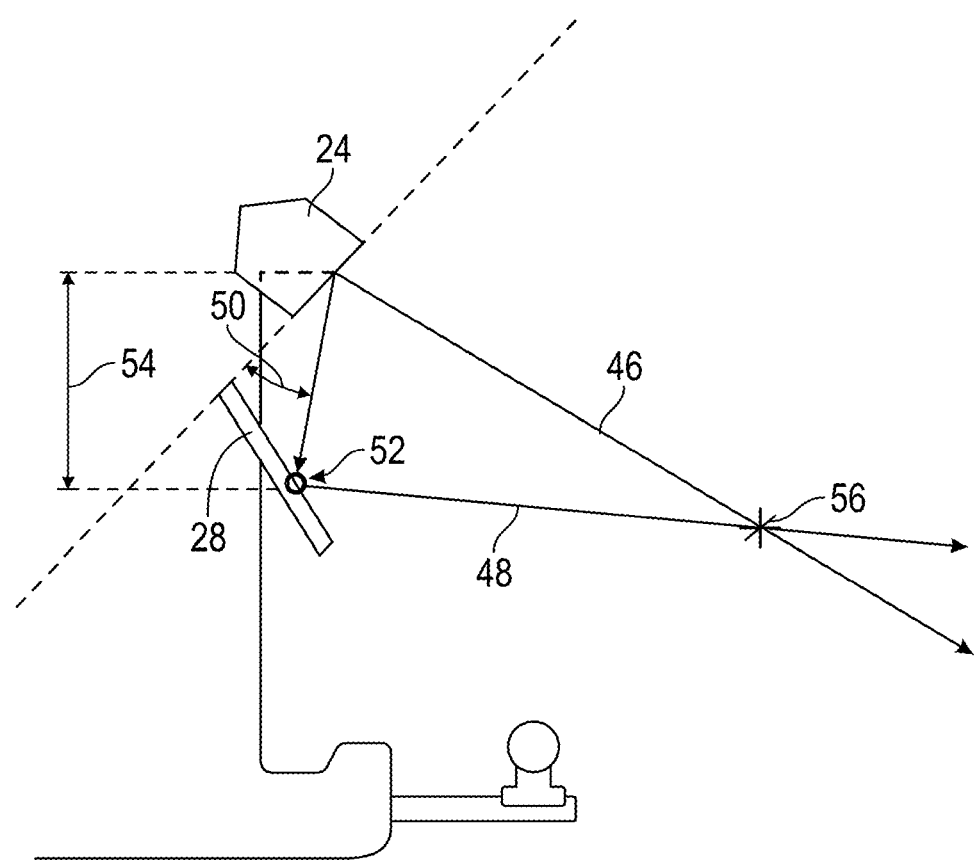
FIG. 4 is an enlarged schematic view of an example rear view camera system embodiment.

Referring to FIG. 4 with continued reference to FIG. 3, the camera 24 and mirror 28 are set at a fixed orientation to each other. In this example, the mirror 28 is set at an angle 50 relative to a plane through the camera face. The mirror 28 is further set a distance 54 from the camera 24. A reflection 52 of an object in the mirror 28 is viewable by the camera 24. The distance of the reflection 52 from the camera 24 is determined utilizing the known relative position and orientation between the mirror 28 and the camera 24. The position of the reflection 52 in the mirror 28 provides for the determination of the direction of the second perspective view 48. A comparison between the first perspective 46 and the second perspective 48 provides for a confirmation of a location of an object as indicated at a crossing point indicated schematically at 56.

Figure 5:
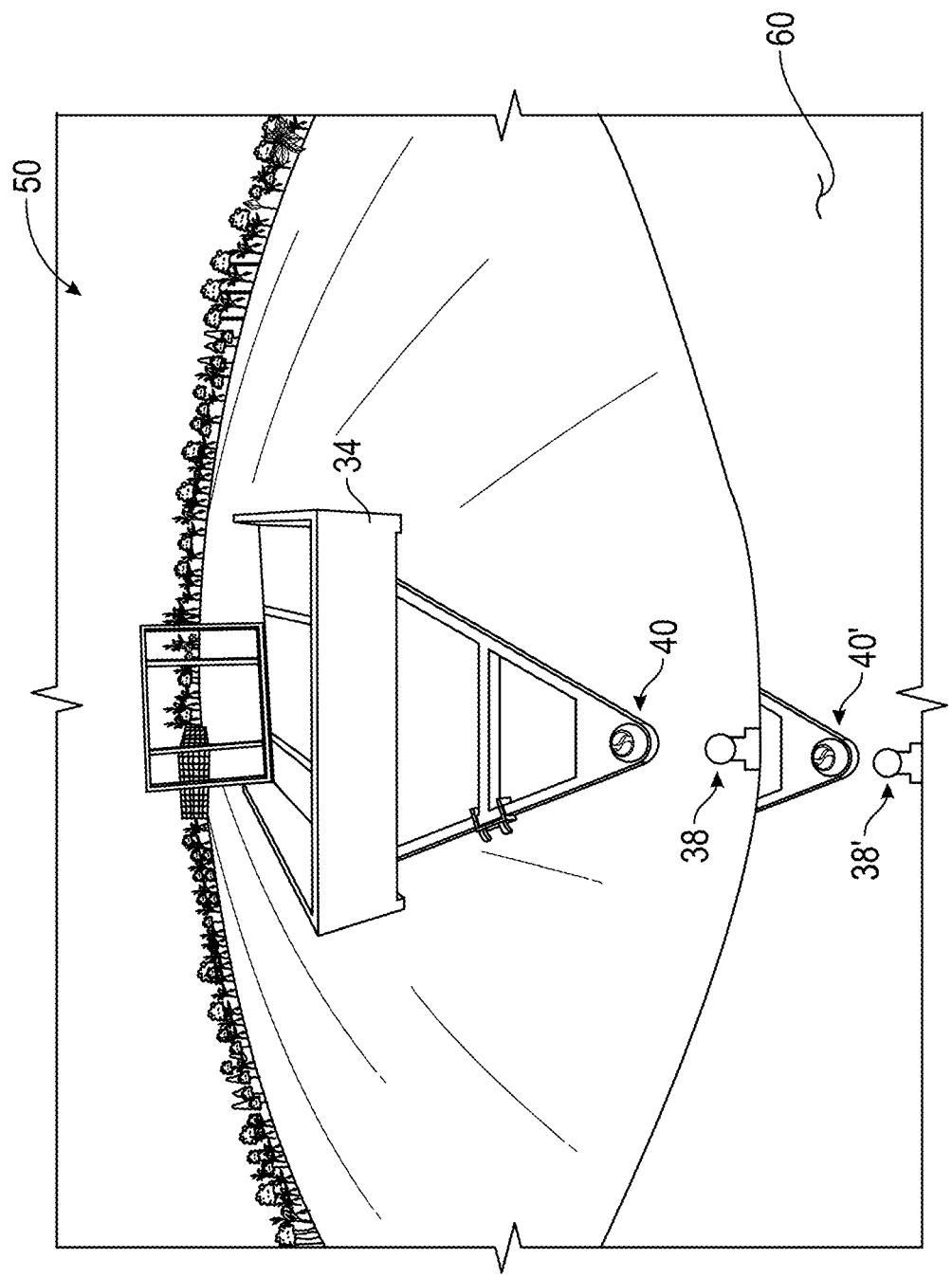
FIG. 5 is a schematic view of a captured image including a reflected image portion generated by the example rear view camera system.

Referring to FIG. 5, with continued reference to FIGS. 3 and 4, an image 58 of a view taken by the example camera 24 is schematically shown. The lower portion of the image is a reflected image 60. The upper portion of the image 58 as shown is as directing viewed by the camera 24. In this example, the trailer 34 includes a hitch 40 and the vehicle includes a tow ball 38. The location of the hitch 40 and tow ball 38 are utilized to guide and aid in hitching the trailer 34 to the vehicle 20.

Accordingly, the relative location between the ball 38 and the hitch 40 is provided by the image 58. The first perspective provided by the camera 24 provides the initial view. The reflected image 60 provides the secondary perspective. A reflection of the tow ball 38' and of the hitch 40' are provided. The controller 36 receives the image with both perspectives and combines the distances and positions of the objects identified in the image, along with the known relative orientation between the camera 24 and the mirror 28 to determine and confirm the location proximate the vehicle 20.

The example camera 24 is a single view camera and therefore, when used alone, provides only a single perspective of objects proximate the vehicle 20. The single perspective may not be as accurate as desired. Accordingly, the mirror 28 provides a secondary perspective, in the same image, that increases accuracy without added costs and complexities associated with stereo-vision cameras.

In operation, the camera 24 captures the image 58 of an environment surrounding the vehicle 20 and the reflection 60 within the mirror 28. The controller 36 receives the image and uses an image analysis algorithm to identify an object within the environment proximate the vehicle 20. In this example, the object is the hitch 40 of the trailer 34.

The controller 36 utilizes the same image analysis algorithm to also identify the reflection of the object within the mirror 28. In this example, the reflection of the tow ball 38' and the hitch 40' are identified. The controller 36 will then have two different perspectives of the same object. The different perspectives of the same object are than utilized to determine a position of the object relative to the vehicle.

Accordingly, the disclosed example camera system includes a mirror visible to the camera to provide an additional perspective of objects surrounding the vehicle that is utilized to determine and confirm the relative position of objects surrounding the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A camera system for a vehicle comprising:
    a camera configured for generating an image of an area proximate the vehicle; and
    a mirror mounted proximate the camera and within a field of view of the camera, the mirror mounted to provide a secondary view of the area proximate the vehicle to the camera; and
    a controller in communication with said camera and programmed to
        receive an image from the camera including a primary view of the area proximate the vehicle and the secondary view of the area proximate the vehicle viewed in the mirror,
        identify an object within the primary view and the secondary view,
        determine an angle between the camera and a point on the mirror corresponding with the reflection of the object, and
        determine a position of the object relative to the vehicle using the image of the object identified in the primary view, the image of the object identified in the secondary view, and the determined angle.

2. The camera system as recited in claim 1, wherein the primary view provides a first perspective of the area proximate the vehicle and the secondary view provides a second perspective of the area proximate the vehicle.

3. The camera system as recited in claim 1, wherein both the camera and the mirror are fixed.

4. The camera system as recited in claim 1, wherein an orientation of the camera relative to the mirror is fixed.

5. The camera system as recited in claim 1, wherein the camera comprises a single view camera.

6. A method of locating an object proximate a vehicle comprising:
    capturing an image of an environment surrounding a vehicle and a reflection within a mirror with a single camera;
    identifying an object within the environment;
    identifying a reflection of the object within the mirror;
    determining an angle between the camera and a point on the mirror corresponding with the reflection of the object; and
    determining a position of the object relative to the vehicle using the identified object, and the reflection of the object, and the determined angle.

7. The method as recited in claim 6, wherein the mirror is mounted at a fixed angle and position relative to the camera.

8. The method as recited in claim 7, wherein the camera includes a first field of view and the mirror is set to provide a second field and the second field of view overlaps a portion of the first field of view to define an overlapped field of view.

9. The method as recited in claim 8, wherein the camera includes a 180 degree field of view and a portion of the 180 degree field of view is replaced in the captured image by the second field of view provided by the mirror.

10. The method as recited in claim 6, further comprising generating a first perspective of the object with the camera and second perspective of the object in the mirror and utilizing the first perspective and the second perspective in determining the position of the object relative to the vehicle.

* * * * *